(12) United States Patent
Flaig et al.

(10) Patent No.: US 7,697,594 B2
(45) Date of Patent: Apr. 13, 2010

(54) METHOD AND APPARATUS FOR REGENERATIVE BASED INTERFERENCE CANCELLATION WITHIN A COMMUNICATION SYSTEM

(75) Inventors: Alexander Flaig, Lowell, MA (US); Samuel MacMullan, Carlisle, MA (US); Harold V Poor, Princeton, NJ (US); Tandhoni S Rao, Ashland, MA (US); Stuart Schwartz, Princeton, NJ (US); Triveni N Upadhyay, Concord, MA (US)

(73) Assignee: Texas Instruments Incorporated, Dallas, TX (US)

( * ) Notice: Subject to any disclaimer, the term of this patent is extended or adjusted under 35 U.S.C. 154(b) by 2242 days.

(21) Appl. No.: 09/820,963

(22) Filed: Mar. 30, 2001

(65) Prior Publication Data

US 2002/0159507 A1   Oct. 31, 2002

(51) Int. Cl.
*H04K 1/00* (2006.01)
(52) U.S. Cl. .................................... 375/148
(58) Field of Classification Search ................. 375/140, 375/148, 142–144, 150, 152, 260, 343; 370/320, 370/335, 342
See application file for complete search history.

(56) References Cited

U.S. PATENT DOCUMENTS 4,208,659 A * 6/1980 Allezard ...................... 342/98
4,295,131 A * 10/1981 Bonori et al. ................ 342/28
5,105,435 A   4/1992 Stilwell
5,218,619 A   6/1993 Dent (Continued)

FOREIGN PATENT DOCUMENTS

EP   0 776 105 A1   5/1997

(Continued)

OTHER PUBLICATIONS

"Multi-stage Interference Canceller Systems with Accurate Radio Channel Estimation Under Fading Environment", Kawakaml, et al., 1997 IEEE 6th International Conference on Universal Personal Communications Record, San Diego, Oct. 12-16, 1997, IEEE International Conference on Universal Personal Communications, New York, IEEE, US, vol. 2, Conf. 6, Dec. 10, 1997, pp. 475-479, XP010248754, ISBN: 0-7803-3777-8.

(Continued)

*Primary Examiner*—Young T. Tse
(74) *Attorney, Agent, or Firm*—Ronald O. Neerings; Wade James Brady, III; Frederick J. Telecky, Jr.

(57) ABSTRACT

Interference cancellation is performed in a communication system. A signal associated with the users is received to produce a received signal. A set of regeneration factors associated with the users is determined based on the received signal. A frequency range associated with a first user from the users has at least a portion overlapping with at least a portion of a frequency range associated with a second user from the users. A time range associated with the first user from the users has at least a portion overlapping with at least a portion of a time range associated with the second user from the users. A regenerated signal associated with each user from the users is modified based on the determined regenerated factor associated with that user to produce a modified regenerated signal for each user.

50 Claims, 10 Drawing Sheets

U.S. PATENT DOCUMENTS

| | | | | |
|---|---|---|---|---|
| 5,329,547 | A | * | 7/1994 | Ling .................... 370/342 |
| 5,442,627 | A | | 8/1995 | Viterbi et al. |
| 5,579,304 | A | | 11/1996 | Sugimoto et al. |
| 5,644,592 | A | | 7/1997 | Divsalar et al. |
| 5,768,307 | A | * | 6/1998 | Schramm et al. ............ 375/150 |
| 5,894,500 | A | | 4/1999 | Bruckert et al. |
| 5,987,076 | A | | 11/1999 | Zehavi et al. |
| 6,002,727 | A | | 12/1999 | Uesugi |
| 6,014,373 | A | | 1/2000 | Schilling et al. |
| 6,034,986 | A | * | 3/2000 | Yellin .................... 375/148 |
| 6,067,333 | A | | 5/2000 | Kim et al. |
| 6,088,383 | A | | 7/2000 | Suzuki et al. |
| 6,154,443 | A | * | 11/2000 | Huang et al. ............... 370/210 |
| 6,298,050 | B1 | * | 10/2001 | van Heeswyk et al. ...... 370/335 |
| 6,496,534 | B1 | * | 12/2002 | Shimizu et al. ............ 375/148 |
| 6,501,788 | B1 | * | 12/2002 | Wang et al. ............... 375/148 |
| 6,574,270 | B1 | * | 6/2003 | Madkour et al. ............ 375/148 |
| 6,798,737 | B1 | * | 9/2004 | Dabak et al. ............... 370/209 |
| 6,898,248 | B1 | * | 5/2005 | Elgamal et al. ............ 375/259 |
| 7,149,200 | B1 | * | 12/2006 | Vadgama .................. 370/335 |

FOREIGN PATENT DOCUMENTS

| | | |
|---|---|---|
| EP | 0 849 886 A | 6/1998 |
| EP | 0 952 682 A2 | 10/1999 |
| WO | WO 99 09674 A | 2/1999 |

OTHER PUBLICATIONS

Joachim Hagenauer et al., "A Viterbi Algorithm with Soft-Decision Outputs and its Applications", IEEE CH2682-3/89/0000-1680, pp. 1680-1686.

Mahesh K. Varanasi et al., "Multistage Detection in Asynchronous Code-Division Multiple-Access Communications", IEEE Transactions on Communications, vol. 38, No. 4, Apr. 1990, pp. 509-519.

M. Benthin, et al., "Viterbi Decoding of Convolutional Codes with Reliability Information for a Noncoherent RAKE-Receiver in a CDMA-Environment", GLOBECOM '94 Conference, San Francisco, Nov. 27-Dec. 1, 1994, pp. 1-5.

Young C. Yoon et al., "A Spread-Spectrum Multi-Access System with a Cascade of Co-Channel Interference Cancellers for Multipath Fading Channels", IEEE Second International Symposium on Spread Spectrum Technologies and Applications (ISSSTA '92) Yokohama, Japan, Nov. 29-Dec. 2, 1992, pp. 87-90.

Christopher J. Hegarty et al., "Noncoherent Multiuser Detection of M-Ary Orthogonal Signals Using a Decorrelator", IEEE 1996 0-7803-3682-8/96, pp. 903-907.

Pulin Patel et al., "Performance Comparison of a DS/CDMA System Using a Successive Interference Cancellation (IC) Scheme and a Parallel IC Scheme under Fading", IEEE 1994 0-7803-1825-0/94, pp. 510-514.

Mahesh K. Varanasi et al., "Noncoherent Decorrelative Detection for Nonorthogonal Multipulse Modulation over the Multiuser Gaussian Channel", IEEE Transactions on Communications, vol. 46, No. 12, Dec. 1998, pp. 1675-1684.

Peter Schramm et al., "Coherent Demodulation for IS-95 Uplink", IEEE 1996 0-7803-3567-8/96, pp. 1073-1077.

Xiaodong Wang et al., "Iterative (Turbo) Soft Interference Cancellation and Decoding for Coded CDMA", IEEE Transactions on Communications, vol. 47, No. 7, Jul. 1999, pp. 1046-1061.

Andrew J. Viterbi, "Very Low Rate Convolutional Codes for Maximum Theoretical Performance of Spread-Spectrum Multiple-Access Channels", IEEE Journal on Selected Areas in Communications, vol. 8, No. 4, May 1990, pp. 641-649.

Sung-Jin Kang et al., "Coherent Detection for DS/CDMA System with MAry Orthogonal Modulation in Multipath Fading Channels", IEICE Transactions on Communications, vol. E82-B, No. 7, Jul. 1999, pp. 1084-1087.

* cited by examiner

METHOD AND APPARATUS FOR REGENERATIVE BASED INTERFERENCE CANCELLATION WITHIN A COMMUNICATION SYSTEM

BACKGROUND OF THE INVENTION

The present invention relates generally to a communication system. More specifically, the present invention relates to interference cancellation with a communication system.

Wireless communications systems commonly employ direct sequence/code division multiple access (DS/CDMA). In practice, DS/CDMA typically provides a greater system capacity than many alternative approaches, such as time division multiple access (TDMA) and frequency division multiple access (FDMA). Nonetheless, demand for wireless communication services is projected to exceed the capacity provided by known DS/CDMA systems. Thus, new approaches may be required to satisfy the increasing demand, to maintain a high Quality of Service (QoS) and to avoid rising prices due to system complexity. One such new approach is DS/CDMA with multiuser detection (MUD).

Known MUD techniques for DS/CDMA systems that employ long spreading sequences (e.g., IS-95 and IS-2000) are successive interference cancellation (SIC) and parallel interference cancellation (PIC) schemes. See, e.g., Viterbi, A., "Very Low Rate Convolutional Codes for Maximum Theoretical Performance of Spread-Spectrum Multiple-Access Channel,"IEEE JSAC, Vol. 8, No. 4, May 1990, pp. 641-649; U.S. Pat. Nos. 5,105,435, 5,218,619, 5,579,304, 5,894,500, 6,002,727 and 6,014,373; which describe SIC and which are all incorporated herein by reference. See also, e.g., Yoon, Y. C., Kohno, R., and Imai, H., "Cascaded co-channel interference canceling and diversity combining for spread-spectrum multi-access over multipath fading channels," Symposium on Information Theory and Its Applications, September 1992; U.S. Pat. Nos. 5,644,592 and 6,067,333; and Patel, P., and Holtzman, "Performance Comparison of a DS/CDMA System using a Successive Cancellation (IC) Scheme and a Parallel IC Scheme Under Fading," ICC, May 1994; which describe PIC and which are all incorporated herein by reference. PIC and SIC typically can be simpler to implement than linear MUD techniques because they do not require an estimate of the cross-correlation between users or matrix inversions. Furthermore, PIC can be generally advantageous over SIC when the set of user signal-to-noise ratios (SNR's) has a small variance as is the case on the reverse link of IS-95, which employs power control. See, e.g., Buehrer, R. M., Correal, N. S., and Woerner R. D., "A Comparison of Multiuser Receivers for Cellular CDMA," IEEE Globecom 1996, Vol. 3, pp. 1571-1577.

Known PIC schemes can be implemented using several stages. The first stage can consist of a set of conventional receivers each matched to a particular user (e.g., a user associated with a particular CDMA code for a particular information channel). The output of each conventional receiver can be either the most likely sequence or the most likely symbols transmitted by the user given the received waveform and ignoring interference caused by other users. After the first stage, an estimate of each of the user's transmission can be regenerated using the most likely sequence or symbols. An interference-reduced waveform can be then created for each user by subtracting all of the other user regenerated signals from the original received signal. The interference-reduced waveform can be then processed by a conventional receiver in the second stage, generating a new most likely sequence or set of most likely symbols for each user. These estimates can be used to regenerate new signals and the above process is repeated in subsequent stages.

In the formation of the interference-reduced waveform by these known systems, each of the regenerated signals is multiplied by a scaling factor that can be determined in one of two ways. First, in a hard-decision PIC (HD-PIC) scheme (described in Yoon et al.), each regenerated waveform is simply multiplied by an estimate of the complex amplitude associated with a particular user (e.g., obtained by such methods as multipath combiners or single-user correlators followed by hard decision devices). The result of this multiplication is then subtracted from the original received signal. Second, in a partial PIC (P-PIC) scheme (described in U.S. Pat. No. 5,644,592), each regenerated waveform is multiplied by an estimate of the complex amplitude and a predetermined factor between 0 and 1 that is fixed for all users in a particular PIC cancellation stage but may vary from stage-to-stage.

HD-PIC and P-PIC schemes both suffer the drawback that even if a symbol decision made for a particular user is unreliable, all or a significant part of the regenerated signal for that user is still subtracted from the received waveform to form the input to the next stage. Consequently, when a symbol decision is incorrect, this subtraction significantly degrades the receiver performance.

SUMMARY OF THE INVENTION

Interference cancellation is performed in a communication system. A signal associated with the users is received to produce a received signal. A set of regeneration factors associated with the users is determined based on the received signal. A frequency range associated with a first user from the users has at least a portion overlapping with at least a portion of a frequency range associated with a second user from the users. A time range associated with the first user from the users has at least a portion overlapping with at least a portion of a time range associated with the second user from the users. A regenerated signal associated with each user from the users is modified based on the determined regenerated factor associated with that user to produce a modified regenerated signal for each user.

DETAILED DESCRIPTION

Figure 1:
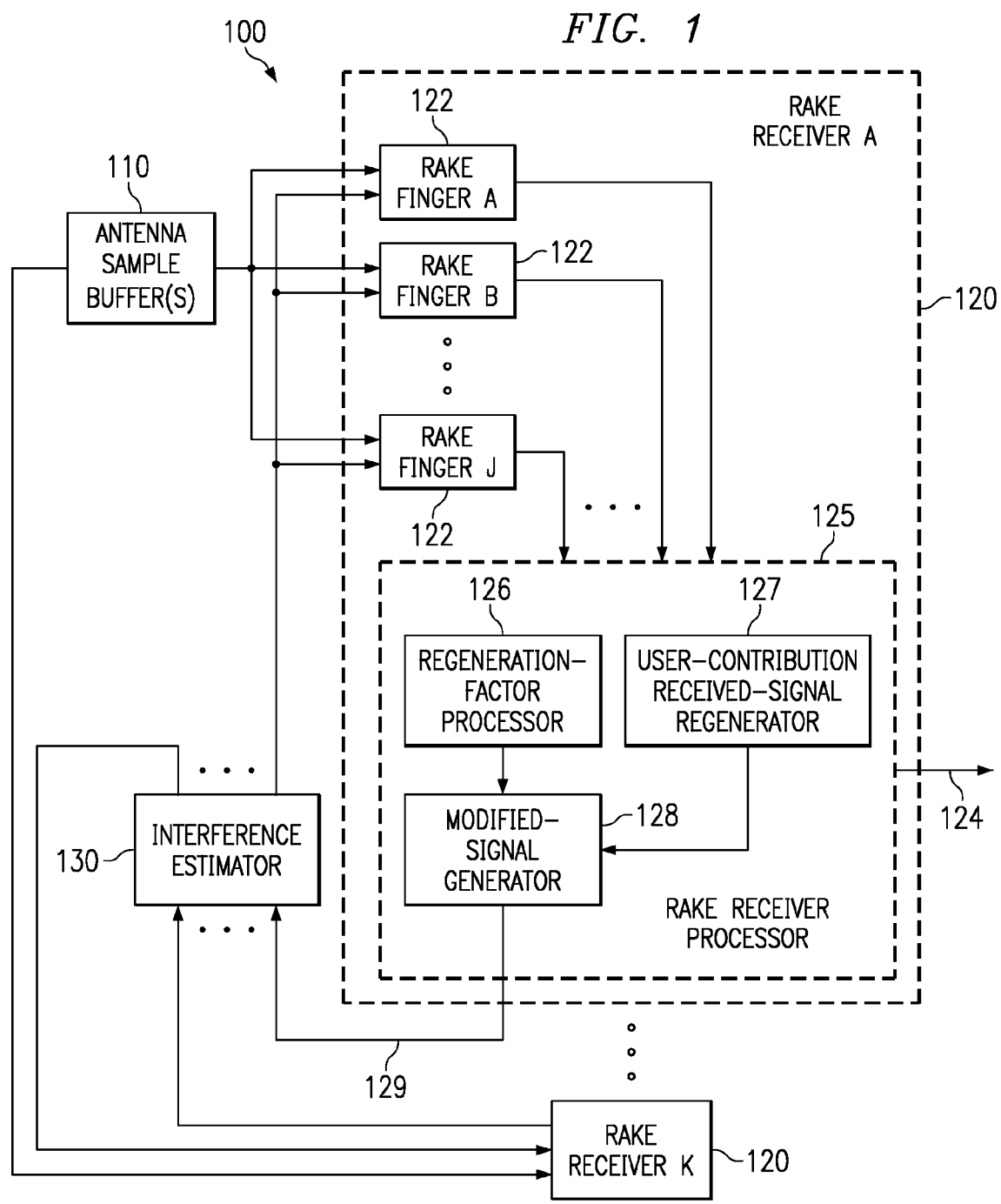
FIG. 1 illustrates a system block diagram of a portion of a receiver having a regenerative interference cancellation (IC) receiver processor, according to an embodiment of the present invention.

Interference cancellation (IC) is performed in a communication system. A signal associated with the users is received to produce a received signal. A set of regeneration factors associated with the users is determined based on the received signal. A frequency range associated with a first user from the users has at least a portion overlapping with at least a portion of a frequency range associated with a second user from the users. A time range associated with the first user from the users has at least a portion overlapping with at least a portion of a time range associated with the second user from the users. A regenerated signal associated with each user from the users is modified based on the determined regenerated factor associated with that user to produce a modified regenerated signal for each user.

In embodiments of the present invention, the regeneration factor is determined by a soft-decision process that takes into account the received signal. The regeneration factor may differ from user to user and from stage to stage. A regenerated signal is then modified based on this regeneration factor to produce a modified regenerated signal for each user. Because the regeneration factor is determined by a soft-decision process that takes into account the received signal and that can be individually tailored for each user for each stage, the regeneration factor provides a more reliable estimate of the modified regenerated signal. Thus, unreliable decisions are weighted lightly in the interference cancellation process (using a relatively low regeneration value) whereas reliable decisions are heavily weighted (using a relatively high regeneration value). Note that this differs from the known systems discussed in the Background section herein where such known systems do not take into account the received signal and do not differ from user to user.

Note also that embodiments of the present invention can cancel interference that has a frequency and a time that overlaps that of the received signal. For example, a communication system can be a code-division multiple access (CDMA) system that includes such subsystems as a CDMA basestation. For such a communication system, IC can be performed where at least two users have overlapping frequency ranges at overlapping times. In an alternative embodiment, the communication system can be a time-division multiple access (TMDA) system that performs IC for received out-of-cell signal(s).

The term "regeneration factor" is used herein to mean a value between 0 and 1 that is determined based on the received signal. A regeneration factor can be based on a determination of the reliability of the decoded information based on the received signal. This factor can be determined, for example, from the soft-information output from a Walsh-Hadamard decoder and subsequent maximum a posteriori (MAP) processing in each receiver (e.g., each rake receiver in a CDMA basestation) to determine the reliability of the decoded information. A regeneration factor where the decoded information is relatively more reliable can have a higher value than for a regeneration factor where the decoded information is less reliable. A regeneration factor can be used to modify the regenerated signal for a given user. The modified regenerated signal can then be combined with modified regenerated signal from the remaining users to produce an interference estimate. The regeneration factor can differ from user to user and from IC stage to IC stage.

FIG. 1 illustrates a system block diagram of a portion of a receiver having a regenerative interference cancellation (IC) receiver processor, according to an embodiment of the present invention. The receiver processor can be, for example, a code-division multiple access (CDMA) receiver. Certain processing elements are generally known (e.g., search processing, early/late tracking and lock detection) and are not included in FIG. 1 for simplicity of presentation.

The receiver 100 can be, for example, a basestation receiver for a CDMA system having multiple users. In such a system, the basestation receiver system can be associated with, for example, a particular allocated spectrum (i.e., frequency range) and with a particular geographic region (i.e., cellular area). Said another way, the basestation receiver system can operate, for example, over a particular frequency range and over a particular cellular area.

The receiver 100 has at least one antenna sample buffer 110 coupled to a set of rake receivers 120. Each rake receiver 120 is associated with a user for the given allocated spectrum and geographic area. Rake receivers 120 are identified within FIG. 1 with an index from A to K. Each rake receiver 120 is coupled to its own interference estimator 130. Although only one interference estimator 130 is shown in FIG. 1 for simplicity of presentation, multiple interference estimators 130 are included within receiver 100.

Each rake receiver 120 includes a set of rake fingers 122, which are coupled to a rake receiver processor 125. Each rake finger 122 is associated with a particular multipath component of the received signal provided from the antenna sample buffer 110. Rake fingers 122 are identified within FIG. 1 with an index from A to J. Note that although each rake receiver 120 is generally described herein as having the same number of rake fingers 122, the specific number of rake fingers 122 need not be the same for all of the rake receivers 120. A rake receiver processor 125 includes a regeneration-factor processor 126 and a user-contribution received-signal regenerator 127, both of which are coupled to a modified-signal generator 128. Rake receiver processor 125 provides an output signal 124 for the rake receiver 120 (once all iteration(s) of interference cancellation processes are complete) and another output signal 129 that couples the rake receiver 120 to the associated interference estimator 130.

Signals received for an antenna (not shown in FIG. 1 ) are buffered at the antenna sample buffer(s) 110. The buffered antenna sample signal is provided to the rake fingers 122A through J for each rake receiver 120A through K. Each rake receiver 120 is associated with a user within the system. Focusing the discussion to a particular rake receiver 120, rake fingers 122A through J each track a different multipath component of the received signal, the initial location of which is determined through the searching process. The number of rake fingers can be, for example, four or six. The approach for interference cancellation described herein is not dependent on the specific number of rake fingers 122 within a rake receiver 120.

The signals produced by the rake fingers 122 are provided to the rake receiver processor 125. These signals are provided to user-contribution received-signal regenerator 127, which reproduces the processing of the transmitter from which the signal sent as received by receiver 100. More specifically, the signals produced by the detection process of the rake fingers 122 are effectively reprocessed to simulate the signal transmitted by the user (and the associated propagation effects on the transmitted signal) thereby regenerating an estimate of the user's contribution to the received signal.

Also, the signals produced by the rake fingers 122 are provided to the 25 regeneration-factor processor 126, which determines a regeneration factor for the particular user with which that particular rake receiver 120 is associated. In other words, for a particular user, the rake receiver 120 associated with that user has a regeneration-factor processor 126 that determines a regeneration factor for that user based on the received signal. Note that each rake receiver 120 (uniquely associated with a specific user) has its own regeneration-factor processor 126 that individually determines a regeneration factor specific to its associated user based on the received signal.

The regenerated signal produced by the user-contribution received-signal regenerator 127 and the regeneration factor produced by the regeneration-factor processor 126 are provided to the modified-signal generator 128. The modified-signal generator 128 adjusts the regenerated signal based on the regeneration factor associated with the particular user, and produces a modified regenerated signal which is provided to interference estimator 130. Interference estimator 130 also receives modified regenerated signals from the remaining rake receivers 120; these modified regenerated signals are each associated with a respective user (and are based on a regeneration factor associated with that respective user).

Interference estimator 130 estimates an interference signal associated with a particular user based on the various modified regenerated signals received from the respective rake receivers 120. More specifically, for a first user for example, the interference estimator 130 receives the modified regenerated signal for that first user and also receives modified regenerated signals for the remaining users. An interference signal affecting the first user's transmission and based on the received signals for each of the remaining users is estimated based on respective received modified regenerated signals. The estimated interference signal is then subtracted from the original received signal by interference estimator 130 to produce an interference-cancelled signal for the first user. This interference-cancelled signal for the first user can be then provided back into the rake receiver 120 for the first user and again processed further to cancel interference from this signal. Said another way, the process for canceling interference can be repeated iteratively thereby canceling more interference with each iteration. The number of iterations can be, for example, pre-selected so that the appropriate number of iterations are performed thereby avoiding diminishing returns from an excessive number of iterations.

Figure 2:
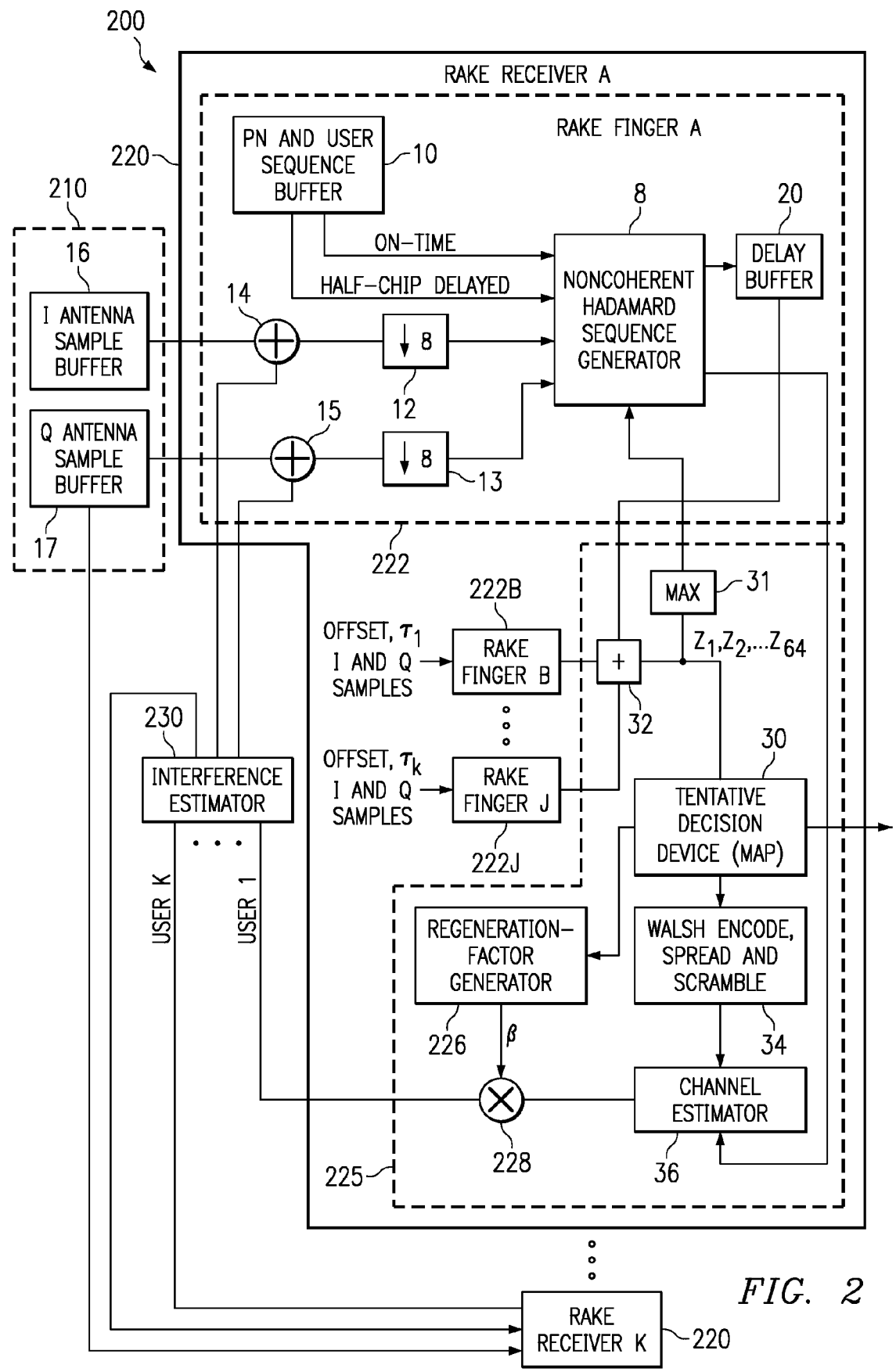
FIG. 2 illustrates a system block diagram of a portion of a CDMA receiver having a regenerative IC receiver processor that is compatible with the IS-95 standard, according to an embodiment of the present invention.

FIG. 2 illustrates a system block diagram of a portion of a CDMA receiver having a regenerative IC receiver processor that is compatible with the IS-95 standard, according to an embodiment of the present invention. Certain processing elements of the CDMA receiver are generally known, such as search processing, early/late tracking and lock detection, that are not included in FIG. 2 for simplicity of presentation.

The CDMA receiver 200 (according to the IS-95 standard) shown in FIG. 2 includes an antenna sample buffer 210, rake receivers 220A through K and interference estimator 230.

Antenna sample buffer 210 is coupled to rake receivers 220A through K. Rake receivers 220A through K are coupled to interference estimator 230.

Antenna sample buffer 210 includes in-phase (I) antenna sample buffer 16 and quadrature (Q) antenna sample buffer 17. Buffers 16 and 17 can be, for example, oversampled by eight times the pseudo-noise (PN) chipping rate of 1.2288 Mbps, for each Walsh symbol. Each buffer, for example, can hold samples from two or more Walsh symbols and old samples can be overwritten with new samples.

Rake receivers 220A through K each include rake fingers 222A through J and receiver processor 225. Rake fingers 220A through J include adders 14 and 15, decimators 12 and 13, noncoherent Hadamard sequence generator 8, PN & user sequence buffer 10 and delay buffer 20. The adders 14 and 15 are coupled to I antenna sample buffer 16 and Q antenna sample buffer 17, respectively and coupled to interference estimator 230. The adders 14 and 15 are coupled to decimators 12 and 13, respectively, which are coupled to noncoherent Hadamard sequence generator 8. Noncoherent Hadamard sequence generator 8 is coupled to PN & user sequence buffer 10 and delay 20 buffer 20.

Receiver processor 225 includes user-contribution received-signal regenerator 227, regeneration-factor generator 226 and modified-signal generator 228. User-contribution received-signal regenerator 227 includes maximizer 31, adder 32, tentative decision device (MAP) 30, Walsh encode, spread and scramble device 34 and channel estimator 36.

Adder 32 is coupled to the delay buffer 20 of the rake finger 222A through J, maximizer 31 and tentative decision device (MAP) 30. Tentative decision device (MAP) 30 is coupled to regeneration-factor generator 226 and Walsh encode, spread and scramble device 34, which in turn is coupled to channel estimator 36. Channel estimator 36 is coupled to FHT buffer 112 of the noncoherent Hadamard sequence generator 8. Modified-signal generator 228 is coupled to regeneration-factor generator 226, channel estimator 36 and interference estimator 230.

Each rake finger and the searcher (not shown in FIG. 2) draw samples from antenna sample buffers 16 and 17 beginning at a certain offset controlled by the searcher. The PN and user sequences associated with a particular Walsh symbol are also loaded into buffer 10 that is accessed by each rake finger and the searchers.

For the first iteration of the interference cancellation process, noncoherent Hadamard sequence generator 8 draws decimated samples from the I and Q antenna sample buffers, 16 and 17. For subsequent iterations, modified estimates of the interference caused by other users are subtracted from the I and Q antenna samples in buffers 16 and 17, respectively, and the result is passed to decimators 12 and 13. Ordinarily, the decimators 12 and 13 provide the noncoherent Hadamard sequence generator with every $8^{th}$ antenna sample (corresponding to a single PN chip and assuming 8× oversampling). Decimators 12 and 13, however, can be configured by an early/late tracker (not shown in FIG. 2) to advance or retard by one antenna sample. For example, the spacing between antenna samples may progress as "88888887888888888988888. . ." where an advance command was received in the $8^{th}$ PN chip interval and a retard command was received in the 18th PN chip interval.

As mentioned earlier, the noncoherent Hadamard sequence generator 8 can operate on blocks of samples corresponding to one Walsh symbol. The PN (I- and Q-channel) and user (long code) sequences corresponding to this symbol are passed from buffer 10 to the noncoherent Hadamard sequence generator 8. In this case, the quadrature sequences can be delayed by half a chip because the transmitter employs offset quaternary phase-shift keying (OQPSK) under the IS-95 standard.

Figure 3:
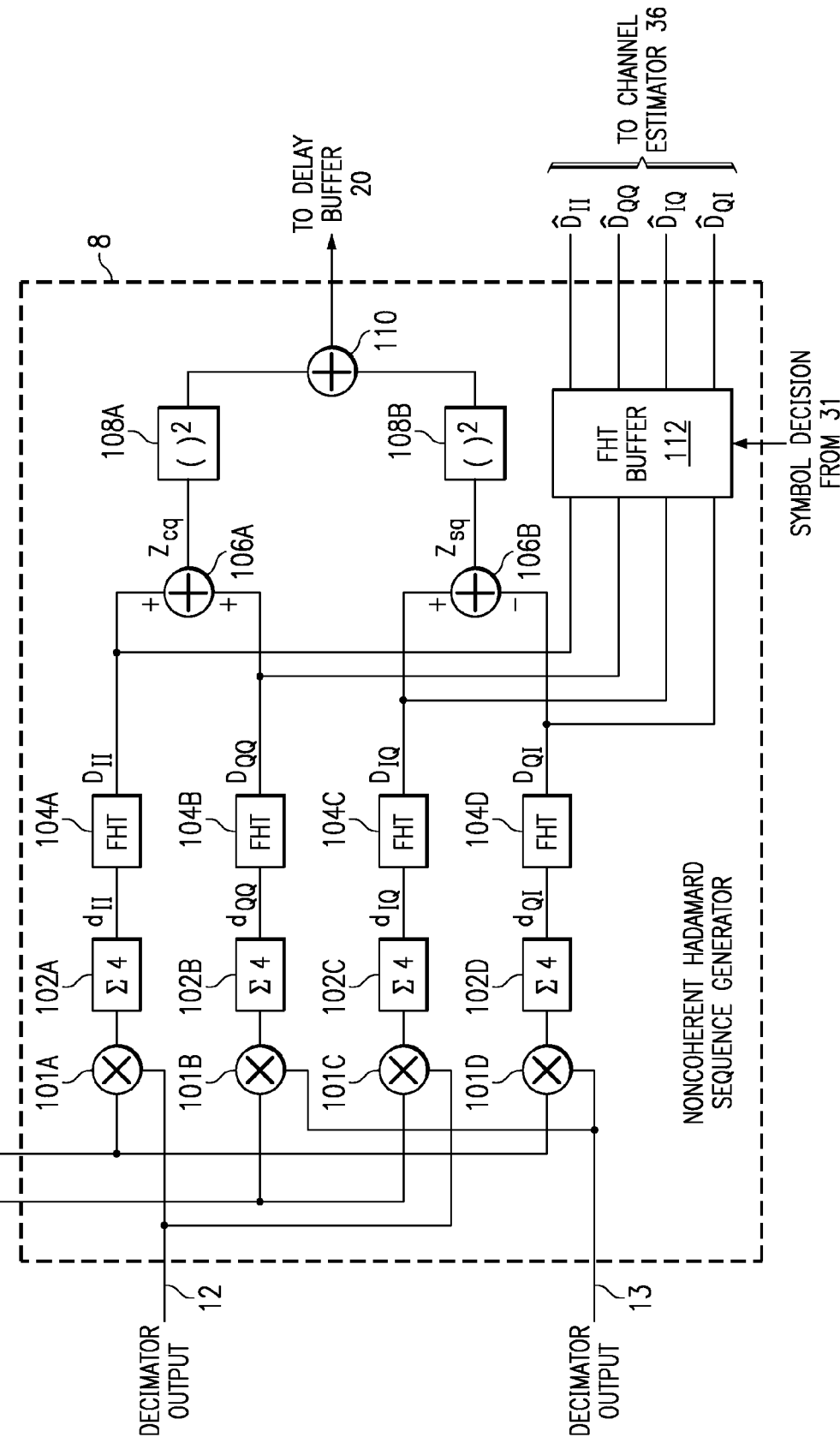
FIG. 3 illustrates a system block diagram of a noncoherent Hadamard sequence generator, according to an embodiment of the present invention.

FIG. 3 illustrates a system block diagram of a noncoherent Hadamard sequence generator, according to an embodiment of the present invention. Noncoherent Hadamard sequence generator 8 includes multipliers 101A, 101B, 101C and 101D, which are coupled to adders 102A, 102B, 102C and 102D, respectively. Adders 102A, 102B, 102C and 102D are coupled to Fast Hadamard Transformers (FHTs) 104A, 104B, 104C and 104D, respectively, which are in turn coupled to FHT buffer 112 and to adders 106A and 106B. Adders 106A and 106B are coupled to squarers 108A and 108B, respectively, which are in turn coupled to adder 110.

Noncoherent Hadamard sequence generator 8 uses multipliers 101A, 101B, 101C, and 101D to multiply the decimated samples received from decimators 12 and 13 (representing each received PN chip) with the PN and user sequences received from the PN & user sequence generator 10. Multipliers 101A, 101B, 101C and 101D produce a signal that is provided to adders 102A, 102B, 102C, and 102D, respectively. Adders 102A, 102B, 102C and 102D group the signals into groups of four and adds them, the factor of four arising because of the spreading induced at the transmitter by the long code. The despread values are denoted $d_{II}$, $d_{QQ}$, $d_{IQ}$, and $d_{QI}$. These despread values, $d_{II}$, $d_{QQ}$, $d_{IQ}$, and $d_{QI}$, are then passed to FHTs 104A, 104B, 104C, and 104D, each of which correlate the values with each of 64 possible Walsh symbols to generate 64 values denoted by the vectors $D_{II}$, $D_{QQ}$, $D_{IQ}$, and $D_{QI}$. These vector values are buffered in FHT buffer 112. The outputs of the FHTs 104A, 104B, 104C, and 104D are then processed using adders 106A, 106B and 110 and squarers 108A and 108B to form decision variables that are provided to delay buffer 20 (FIG. 2). These decision variables represent the correlation of the received signal with each of the 64 Walsh symbols. The decision variables from adders 110 are delayed by delay buffer 20 by an amount determined by the searcher (not shown) and early/late tracker (not shown).

Returning to FIG. 2, the decision variables from delay buffer 20 of each rake finger 220A through J are summed using adder 32 to form a rake receiver outputs $Z_1, Z_2 \ldots Z_{64}$. Alternatively, if maximal ratio combining (MRC) is used, the decision variables from delay buffer 20 of each rake finger 222A through J can be weighted by an estimate of the signal-to-noise ratio (SNR). Before summing, the output from a particular finger may be zeroed if the associated lock detector determines that the signal is too weak for inclusion in subsequent processing.

The decision variables $Z_1, Z_2, \ldots, Z_{64}$ are passed through a tentative decision device 30, which takes the correlation values and produces a soft-estimate of the coded data for the user associated with that rake receiver. The tentative decision device 30 can 30 employ, for example, a suboptimum, reduced-complexity version of the MAP algorithm known as the dual maxima metric generator, described in U.S. Pat. No. 5,442,627 issued to Viterbi, which is incorporated herein by reference. The tentative decision device 30 provides outputs to Walsh encode, spread and scramble device 34 and to regeneration-factor generator 226. First, a tentative decision device 30 makes a hard decision on the soft information and provides the resulting data to Walsh, encode, spread and scramble device 34, which then Walsh encodes the data, spreads it using the long code assigned to the particular user, and then scrambles it using the short I and Q codes assigned to the receiver 200. Tentative decision device 30 also provides the soft-estimate of the data to the regeneration-factor generator 226. Regeneration-factor generator 226 averages the soft-estimate of the data (e.g., the six soft-estimates corresponding to the six coded bits comprising a Walsh symbol) and the average value is used to form the soft-decision regeneration factor, $\beta_k$.

Modified-signal generator 228 multiplies the output of channel estimator 36 by the regeneration factor to produce a modified signal that is provided to interference estimator 230. In one embodiment, the hyperbolic tangent function is applied to the average soft-decision divided by two to form the regeneration factor. The tentative decision device 30 also generates an output for subsequent receiver processing (e.g., deinterleaving and Viterbi decoding) once the one or more iterations of the interference cancellation process is complete and the signal is to be passed for other processing.

Note that this embodiment of the present invention averages over each of the six coded bits rather than doing the weighting on a symbol-by-symbol basis. This can significantly decrease the complexity of the receiver system 100 because the Walsh encoded, spread, and scrambled sequence need only to be multiplied by a single value, $\beta$, rather than a complicated function of the six coded bits.

Channel estimator 36 replicates the baseband waveform J times where J corresponds to the number of rake fingers. The replication process performed by channel estimator 36 produces J multipath components each with complex amplitude derived through the process described below. Each component is then delayed by an amount determined by the searcher (not shown) and early/late tracker (not shown) and the resulting J waveforms are summed by channel estimator 36 to produce an estimate of the received waveform. The output of each rake receiver 220 is passed to interference estimator 230 to form the inputs to the next iteration of the interference cancellation process.

Figure 4:
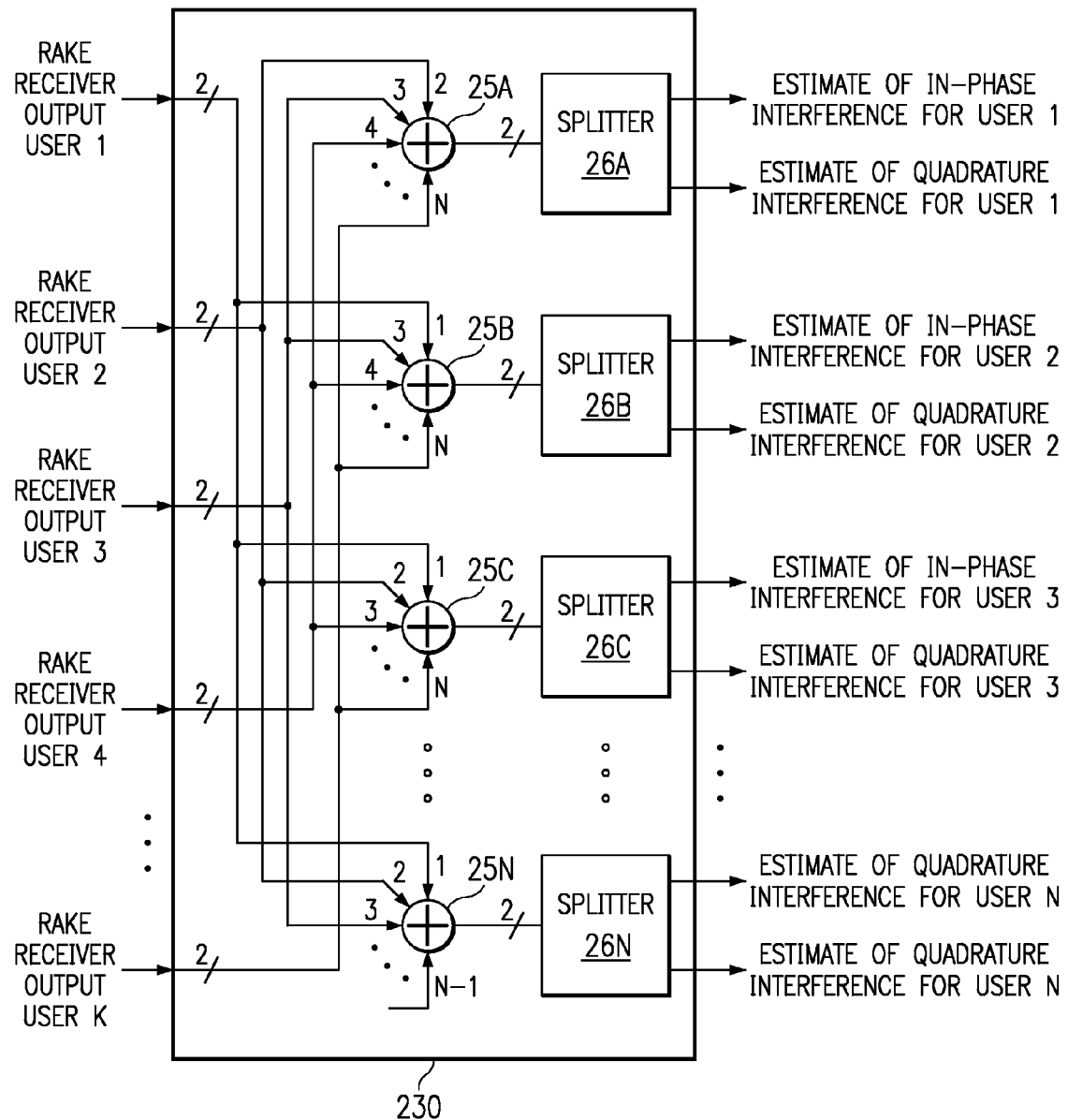
FIG. 4 shows a system block diagram of an interference estimator, according to an embodiment of the present invention.

FIG. 4 shows a system block diagram of an interference estimator, according to an embodiment of the present invention. Interference estimator 230 has K inputs and 2K outputs, where K corresponds to the number of users processed by the receiver system 200. K−1 the inputs are used to form the pair of outputs destined for the next stage in a certain receiver's rake receiver. The K−1 inputs processed for user i are $\{1, 2, \ldots, i-1, i+1, i+2, \ldots, K\}$, i.e., only the $i^{th}$ input is excluded. The K−1 inputs for user i are summed by adder 25i and then are split by splitters 26 into real and imaginary parts, which are then sent onto adders 14 and 15 in the $i^{th}$ rake receiver.

Returning to FIG. 2, maximizer 31, channel estimator 36 and portion of the noncoherent Hadamard sequence generator 8 perform channel estimation. Referring to FIG. 3, the outputs, $D_{II}$, $D_{QQ}$, $D_{IQ}$ and $D_{QI}$ from the FHTs 104A, 104B, 104C and 104D are sent to FHT buffer 112. Meanwhile, maximizer 31 (shown in FIG. 2) receives the 64 outputs, $Z_1, Z_2, \ldots, Z_{64}$, of adder 32 and forms the index corresponding to the largest of the 64 outputs. FHT buffer 112 then uses this index to choose the most likely values of $D_{II}$, $\hat{D}_{QQ}$, $D_{IQ}$ and $D_{QI}$, denoted $\hat{D}_{II}$, $\hat{D}_{QQ}$, $\hat{D}_{IQ}$ and $\hat{D}_{QI}$ respectively. These values are then sent from the FHT buffer 112 of rake receiver 220 to channel estimator 36.

Figure 5:
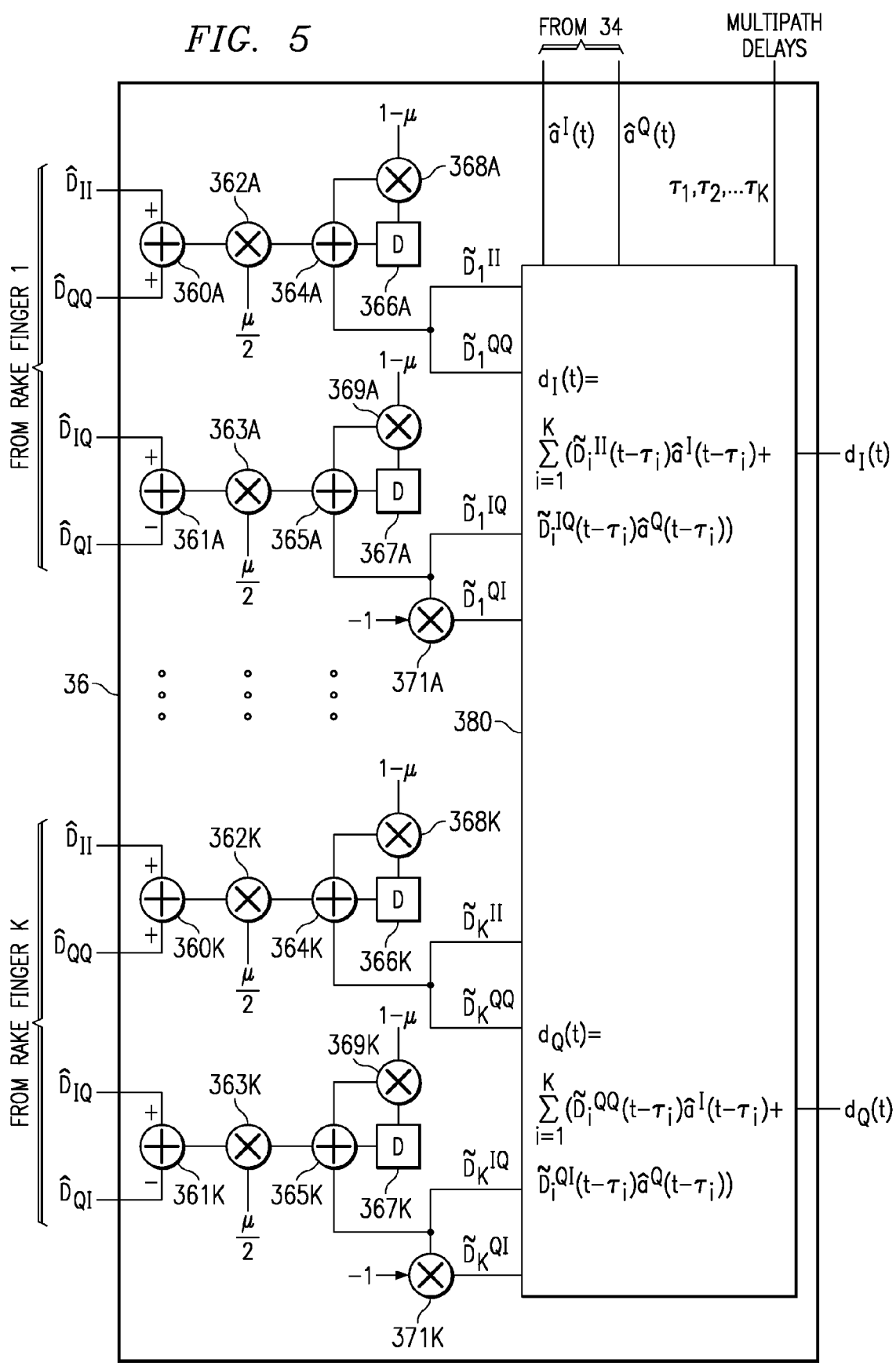
FIG. 5 illustrates a system block diagram of a channel estimator, according to an embodiment of the present invention.

FIG. 5 illustrates a system block diagram of a channel estimator, according to an embodiment of the present invention. Channel estimator 36 receives the values of $\hat{D}_{II}$, $\hat{D}_{QQ}$, $\hat{D}_{IQ}$ and $\hat{D}_{QI}$ from each rake finger 222 and adds them using adders 360A through K and 361A through K. Multipliers 362A through K and 363A through K receive the outputs of these adders and then multiply them by a constant $\mu/2$, the value of which will be discussed below. The output of the multipliers 362A through K and 363A through K are then sent into a first-order lowpass filter comprising adders 364A through K and 365A through K, delay elements 366A through K and 367A through K, multipliers 368A through K and 369A through K, and multipliers 371A through K. The following equations summarize the channel estimation process:

$$\tilde{D}_i^{II} = \tilde{D}_i^{QQ} = \frac{\mu(\hat{D}_i^{II} + \hat{D}_i^{QQ})}{2} + (1-\mu)\tilde{D}_{i-1}^{II}$$

$$\tilde{D}_i^{IQ} = -\tilde{D}_i^{QI} = \frac{\mu(\hat{D}_i^{IQ} + \hat{D}_i^{QI})}{2} + (1-\mu)\tilde{D}_{i-1}^{IQ}$$

The cutoff frequency of the lowpass filter is determined by the constant $\mu$. This constant is chosen based on the expected Doppler frequency of a particular user. The constant $\mu$ can be, for example, a value of 0.7 which is assumed in the performance studies described below in connect with FIG. 6. The output. of the lowpass filter is then sent to processor 380. Processor 380 receives the lowpass filter outputs and receives the data decisions from Walsh encode, spread and scramble device 34, to estimate of the. multipath delays. Processor 380 then uses these multipath delays to form an estimate of the I and Q component of the transmitted signal.

Figure 6:
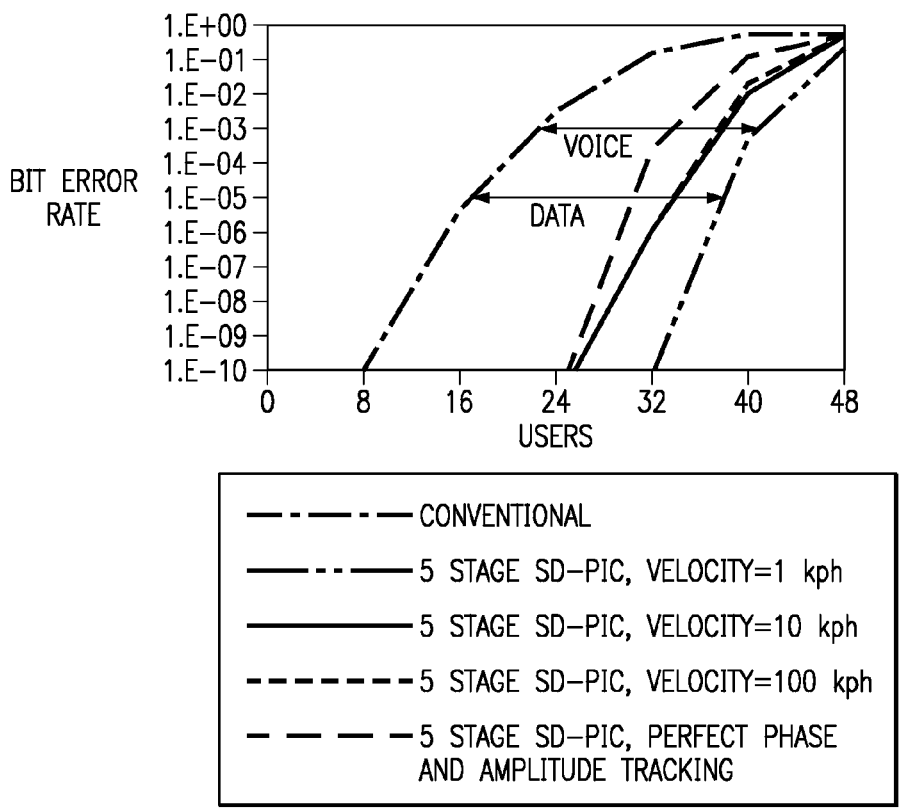
FIG. 6 is a graph that compares the performance of a conventional DS/CDMA receiver and an embodiment of the present invention assuming the IS-95 reverse link.

FIG. 6 is a graph that compares the performance of a conventional DS/CDMA receiver and an embodiment of the present invention assuming an IS-95 reverse link. The bit error rate (BER) is calculated as a function of the number of users communicating with the receiver system 200 (e.g., a basestation). The results are derived via simulation and assuming an $E_b/N_0$=8 dB where $E_b$ equals energy per bit, and $N_0$ equals noise power spectral density. In addition, as described above, a filter coefficient of $\mu$=0.7 is used. Results are shown for vehicle velocities of 0, 1, 10 and 100 kph. The performance degrades as the vehicle velocity increases because the phase and amplitude estimate accuracy is reduced. Nonetheless, even with a 100 kph velocity, the performance gain at typical required voice and data BERs ($10^{-3}$ and $10^{-5}$, respectively) is roughly 70%. It is expected that this gain can be improved by optimizing the choice of $\mu$ or by using a more complex filtering process to generate the phase and amplitude estimates.

Note that the above discussion can apply to, for example, power-controlled users or users soft-handoff with a particular receiver system (e.g., a basestation). The more interference that can be identified and cancelled by a receiver according to an embodiment of the present invention, the better the performance that can be obtained. The receiver system (e.g., basestation) can perform the same physical layer processing for power-controlled users and users in soft-handoff. Therefore, signals from both types of users can be regenerated and subtracted from the received signal to form the input to the additional iteration(s) of interference cancellation. Sometimes, the signals from a user in soft-handoff will be significantly weaker than the signals from power-controlled users and too weak to allow accurate regeneration of the transmitted waveform. For such a user, however, the soft-decision regeneration factor will be small and the effect of the inaccurate regeneration will be negligible on the system performance.

Figure 7:
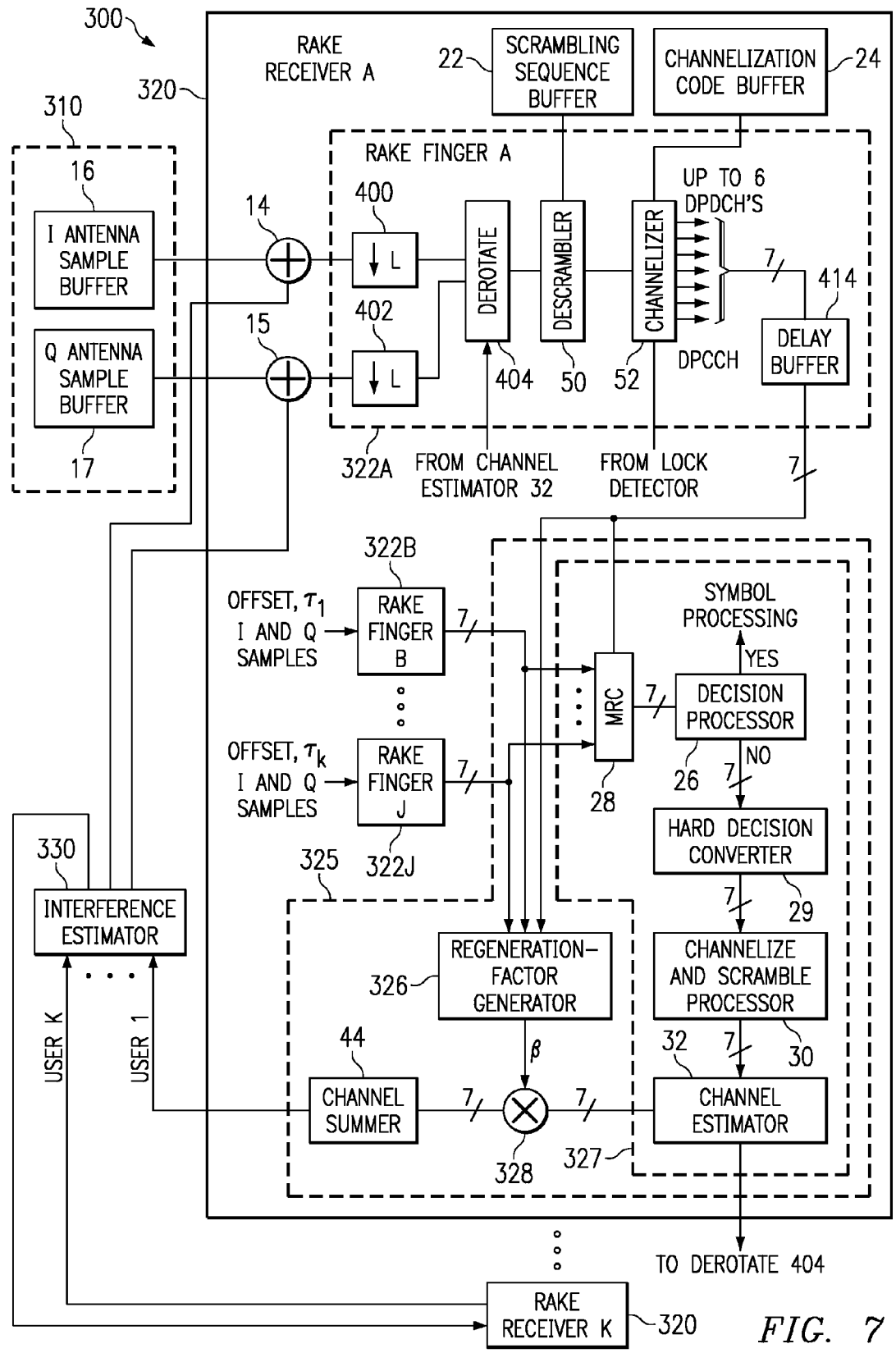
FIG. 7 illustrates a system block diagram of a portion of a CDMA receiver having a regenerative IC receiver processor that is compatible with the W-CDMA standard, according to an embodiment of the present invention.

FIG. 7 illustrates a system block diagram of a portion of a CDMA receiver having a regenerative IC receiver processor that is compatible with the W-CDMA standard, according to an embodiment of the present invention. As indicated above, certain processing elements of the CDMA receiver are generally known, such as search processing, early/late tracking and lock detection, and thus, as in the preceding system descriptions are not included in FIG. 7 for simplicity of presentation.

Unlike the IS-95 standard, the W-CDMA standard specifies a transmitter structure that is more typical of traditional direct sequence spectrum systems. For example, the extra encoders (i.e., the FHTs) present a system that conforms to the IS-95 standard are not required for a system that conforms to the W-CDMA standard. In addition, the use of a pilot signal absent from the IS-95 standard is present in the W-CDMA standard. As a consequence, the CDMA receiver that conforms to the W-CDMA standard differs from the CDMA receiver that conforms to the IS-95 standard and is described in reference to FIG. 7.

The CDMA receiver 300 (according to the W-CDMA standard) shown in FIG. 7 includes an antenna sample buffer 310, rake receivers 320A through K and interference estimator 230. Antenna sample buffer 310 is coupled to rake receivers 320A through K. Rake receivers 320A through K 320 are coupled to interference estimator 230.

Antenna sample buffer 310 includes in-phase (I) antenna sample buffer 16 and quadrature (Q) ntenna sample buffer 17. Buffers 16 and 17 can be, for example, oversampled by eight times the pseudo-noise (PN) chipping rate of 1.2288 Mbps, for each Walsh symbol. Each buffer, for example, can hold samples from one or more symbols.

Rake receivers 320A through K include adders 14 and 15, rake fingers 322A through J, receiver processor 325, scrambling sequence buffer 22 and channelization code buffer 24. For a given rake receiver 320, the rake finger 322 and the searcher (not shown) draw samples from antenna sample buffers 16 and 17 beginning at a certain offset controlled by the searcher (not shown). The scrambling sequences and channelization codes associated with a particular symbol are also loaded into buffers 22 and 24, respectively, that are accessed by each rake finger 322 and the searchers (not shown).

Receiver processor 325 includes user-contribution received-signal regenerator 327, regeneration-factor generator 326, modified-signal generator 328 and channel summer 44. User-contribution received-signal regenerator 327 includes maximal ratio combiner (MRC) 28, decision processor 26, hard-decision converter 29, channelizer and scramble processor 30 and channel estimator 32.

MRC 28 is coupled to delay buffers 14 from the rake fingers 322A through J. Decision processor 26 is coupled to MRC 28 and hard decision 29, and provides an output for rake receiver 320. Hard decision converter 29 is coupled to channelize and scramble device 30, which is in turn coupled to channel estimator 32, which is in turn coupled to modified-signal generator 328.

Regeneration-factor generator 326 is coupled to delay buffers 14 from the rake fingers 322A through J, and is also coupled to modified-signal generator 328. Modified signal generator 328 is coupled to channel summer 44, which is in turn coupled to interference estimator 330. Channel summer 44 provides to the interference estimator 330 a signal that is an estimate of the user's contribution to the transmitted signal. Note that the channel summer 44 is an additional component of rake receiver processor 325 (not initially discussed in reference to rake receiver processor 125 of FIG. 1 ) that sums the various signal components from the rake fingers 322A through J consistent with the WCDMA standard.

Interference estimator 330 provides signals to adders 14 and 15. The signal from interference estimator 330 to adder 14 is an estimate of in-phase interference from other users.

The signal from interference estimator 330 to adder 15 is an estimate of quadrature interference from other users.

Figure 8:
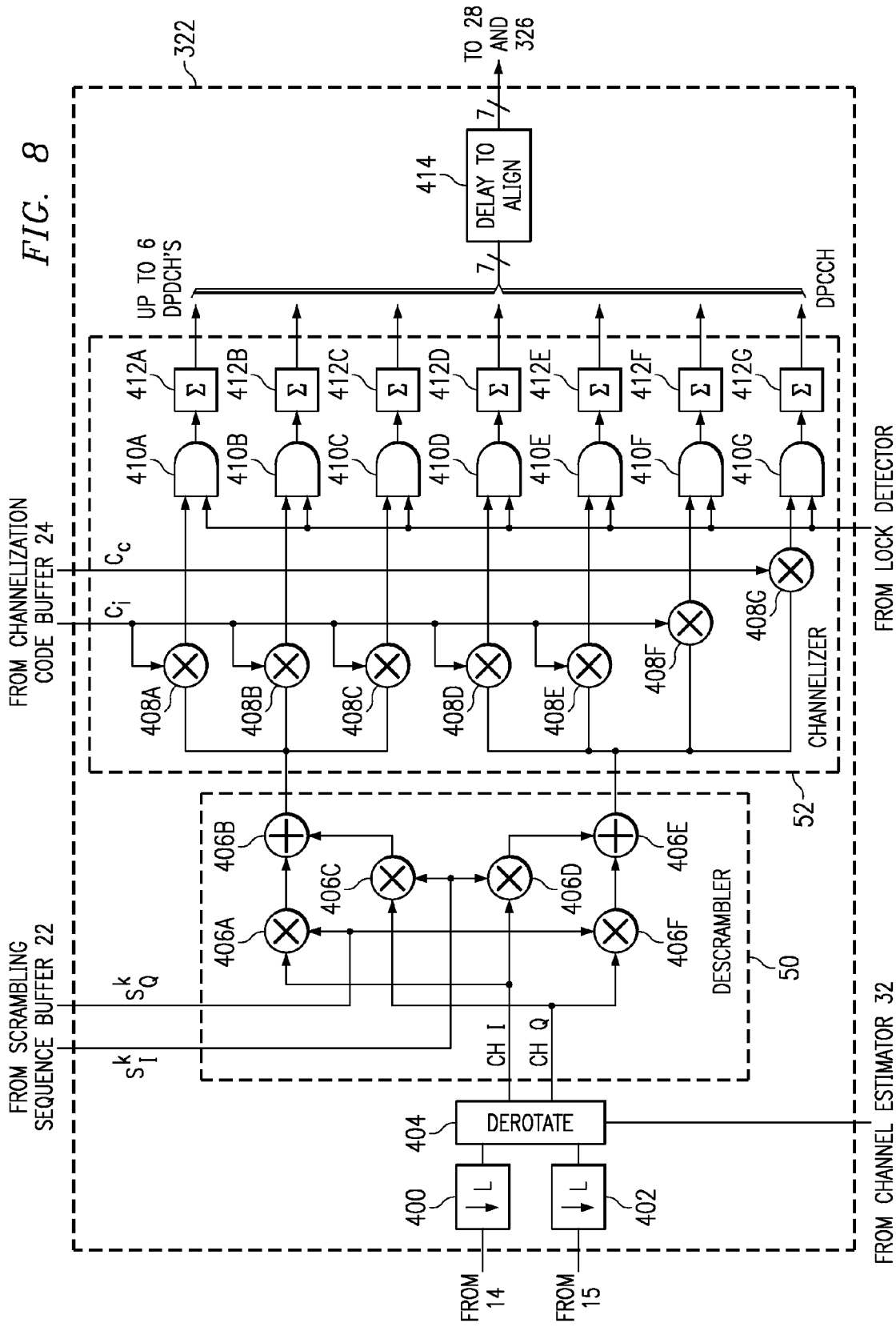
FIG. 8 illustrates a system block diagram of a rake finger for the receiver shown in FIG. 7.

FIG. 8 illustrates a system block diagram of a rake finger for the receiver shown in FIG. 7. Rake fingers 322A through J each include decimators 400 and 402, derotator 404, descrambler 50, channelizer 52 and delay buffer 14. Decimators 400 and 402 are coupled to adders 14 and 15, respectively. Decimators 400 and 402 are coupled to derotator 404, which is in turn coupled to descrambler 50. Descramble 50 is coupled to scambling sequence buffer 22 and channelizer 52. Channelizer 52 is coupled to channelization code buffer 24 and delay buffer 14.

Modified estimates of the interference caused by other users are subtracted. by adders 14 and 15 from the I and Q antenna samples, respectively, and the result is passed to decimators 400 and 402. Note that in the first iteration of interference cancellation, the modified estimates are all zero. Ordinarily, the decimator (400 and 402) provides the derotator 404 with every $L^{th}$ antenna sample (corresponding to a single PN chip and assuming L times oversampling). The early/late tracker (not shown), however, may instruct the decimator to advance or retard by one antenna sample. For example, assuming L=8, the spacing between antenna samples may progress as "8888888788888888988888 . . . " where an advance command was received in the 8PN chip interval and a retard was received in the $18^{th}$ PN chip interval.

As mentioned earlier, the rake finger 322 can operate on blocks of samples corresponding to one symbol. The scrambling sequences corresponding to this symbol can be passed from scrambling sequence buffer 22 to the rake finger 322. The rake finger 322 can use the scrambling sequences and multipliers 406A, 406C, 406D and 406F, and adders 406B and 406E to perform the W-CDMA complex descrambling. The outputs from the descrambler 50 are then sent to channelizer 52. Channelizer 52 splits the outputs of 406B into several in-phase channels and the output of 406E into several quadrature channels.

The in-phase channel can contain, for example, a single dedicated physical data channel (DPDCH) and the quadrature channel can contain, for example, the dedicated physical control channel (DPCCH). Alternatively, the in-phase and quadrature channel may each contain up to three total DPDCH's and the quadrature channel can also include the DPCCH. The subsequent discussion assumes the maximum number of DPDCH's (i.e., six), although any number of DPDCH's are possible. Alternatively, a certain rake receiver can be employed to demodulate a physical random access channel (PRACH) or physical common packet channel (PCPCH). The described interference cancellation approach can also be used to process PRACH's and PCPCH's.

The in-phase channels are multiplied by channelization codes, $c_d$, from channelization code buffer 24 using multipliers 408A, 408B and 408C. Each DPDCH has a different channelization code. The outputs from multipliers 408A, 408B and 406C are 10 then sent to one of the inputs of "and" gates 410A, 410B and 410C, respectively. The other "and" gate input is sent from a lock detector (not shown), which determines whether the signal is too weak for inclusion in subsequent processing. The outputs from "and" gates 410A, 410B and 410C are then sent to adders 412A, 412B and 412C, respectively. Adders 412A, 412B and 412C sum the outputs from 410A, 410B and 410C over spreading factor (SF) values where SF is the spreading factor used for a particular channel. The outputs from adders 412A, 412B and 412C are then sent to delay buffer 14, which delays the signal to align it with the signals from other rake fingers 322. The FIG. 8 lines to and from delay buffer 14 carry seven channels (six DPDCH's and one DPCCH) as represented by the $+^7$ notation.

Up to three quadrature channels are multiplied by the channelization code, Cd, from channelization code buffer 24 using multipliers 408D, 408E and 408F. The outputs from multipliers 408D, 408E and 406F are then sent to one of the inputs of "and" gates 410D, 410E and 410F, respectively. The other "and" gate input is sent from a lock detector (not shown), which determines whether the signal is too weak for inclusion in subsequent processing. The outputs from and gates 410D, 410E and 410F are then sent to adders 412D, 412E and 412F, respectively. These adders 412D, 412E and 412F sum the outputs from 410D, 410E and 410F, respectively over SF values where SF is the spreading factor used for a particular channel. The outputs from adders 412D, 412E and 412F are then sent to delay buffer 14, which delays the signal to align it with the signals from other rake fingers.

One quadrature channel, corresponding to the DPCCH, is multiplied by the channelization code, $c_c$, from channelization code buffer 24 using multiplier 408G. The output from multiplier 408G is then sent to one of the input of "and" gate 410G. The other "and" gate input is sent from a lock detector (not shown), which determines whether the signal is too weak for inclusion in subsequent processing. The output from the "and" gate 410G is then sent to adder 412G, which sums the output over 256 values (256 is the spreading factor for the DPCCH). The output from adder 412G is then sent to delay buffer 14, which delays the signal to align it with the signals from other multipath components.

Returning to FIG. 7, the output of each rake finger 322A through J is sent to maximal ratio combiner (MRC) 28 to form a soft-decision on a particular channel. The MRC output is passed to decision processor 26. In the first M−1 iterations, given an M-stage PIC, the MRC output is passed through the decision processor 26 to hard-decision converter 29, which outputs either a 0 or 1 depending on the MRC output. Channelize and scramble processor 30 then uses the hard-decision to regenerate an estimate of each sequence received by the receiver system 300 (e.g., a basestation). The regenerated sequence is multiplied by a channel estimate in channel estimator 32; the estimate typically given by monitoring the pilot signal to calculate the phase and amplitude of each tracked multipath.

The rake finger outputs 322A through J are also passed to regeneration-factor 20 generator 326 to form a soft-decision regeneration factor, β, for each of the J multipath components. The regeneration factor, β, is calculated by applying, for example, the hyperbolic tangent function to the soft-decision divided by the noise variance input to the rake finger. Channel estimator 32 can replicate the baseband waveform J times where J corresponds to the number of rake fingers. The replication process forms J multipath components each with complex amplitude. Each component is then delayed by an amount determined by the searcher and early/late tracker and the resulting J waveforms are summed to form an estimate of the received waveform. The output of each rake receiver 322 is passed to interference estimator 330 to form the inputs for the next iteration of interference cancellation. The interference estimator 330 can be an embodiment similar to interference estimator 230 illustrated in FIG. 4.

The data rate for different users and channels may differ. Embodiments of the present invention can account for this by varying the number of symbols that are used to generate the interference-reduced waveform for each user and channel. The size of buffers 10 and 12 can be set to the maximum symbol duration $T_s$ plus the time $T_m$ to account for any asynchronism and propagation delays.

Figure 9:
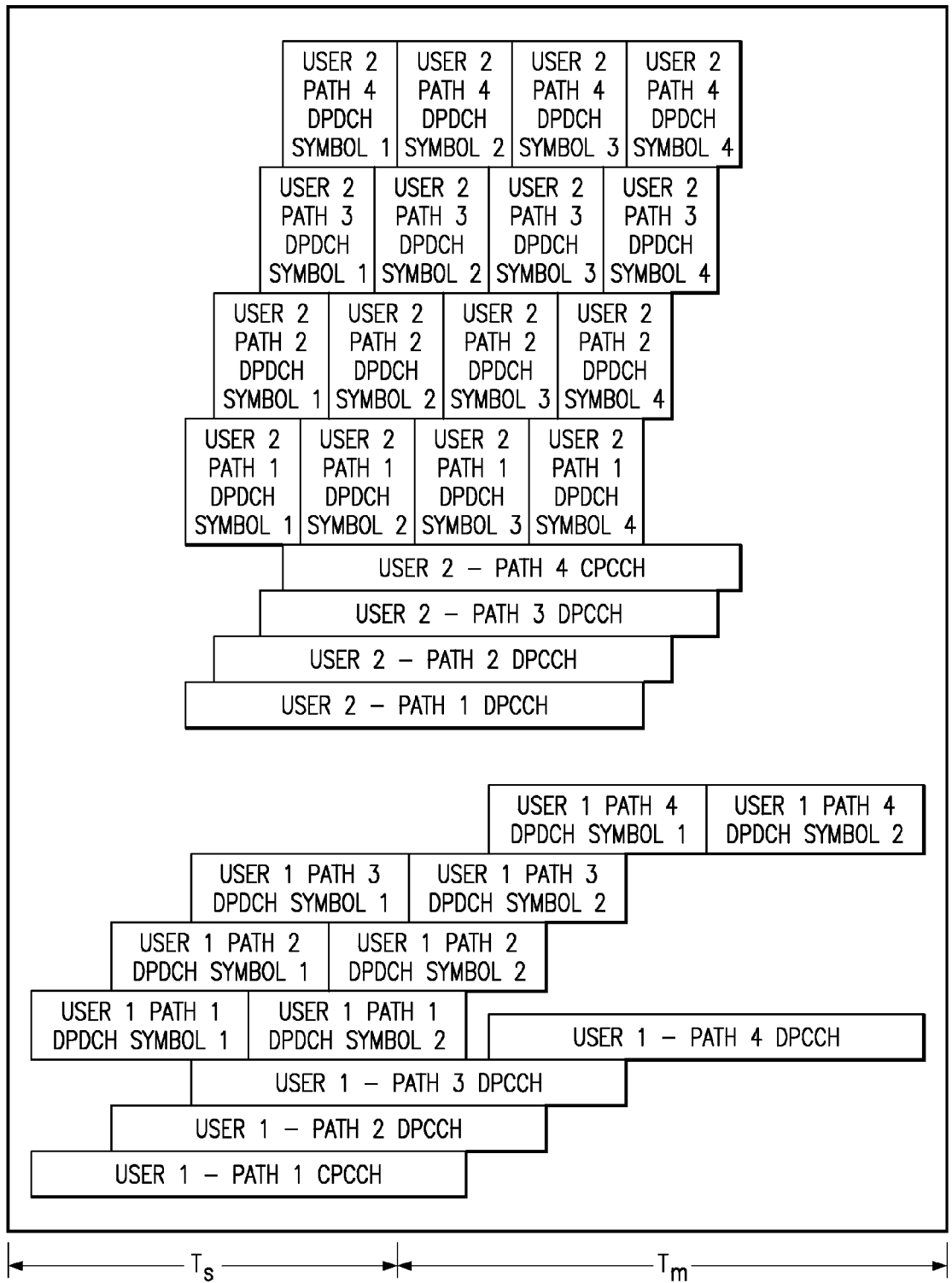
FIG. 9 provides a timing diagram that illustrates an example of how the antennas buffers of the receiver system of FIG. 7 would be used in the received-signal based IC process given two users each transmitting a single DPDCH and four rake fingers per user.

FIG. 9 provides a timing diagram that illustrates an example of how the antennas buffers of the receiver system of FIG. 7 would be used in the regenerative IC process given two users each transmitting a single DPDCH and four rake fingers per user. In this example, the DPCCH uses a spreading factor of 256 and therefore a DPCCH symbol has duration equal to $T_s$. The example shown in FIG. 9 assumes that the user 1 DPDCH has a spreading factor of 128 and, hence, DPDCH symbol duration of $T_s/2$. Whereas, it is assumed that user 2 has a DPDCH symbol duration of $T_s/4$ and a corresponding spreading factor of 64.

After the first regenerative IC iteration, the DPCCH symbol for each user is determined, multiplied by an estimate of the channel gain for each of the four multipath components, and then multiplied by the soft-decision regeneration factor for each path. The result is then sent to channel summer 44. Because there are two user 1 DPDCH symbols per DPCCH symbol, two user 1 DPDCH symbols are estimated and multiplied by the four channel gain estimates and soft-decision regeneration factors. The multiplication 20 result is sent to channel summer 44 and added to the regenerated. DPCCH signal to form an estimate of the contribution of user 1 to the received signal. For user 2, there are four DPDCH symbols per DPCCH so the regeneration process is performed on four user 2 DPDCH symbols. The user 2 regenerated signals are passed to summer 44 which sums the four regenerated DPDCH symbols and one DPCCH and sends the result onto interference estimator 330 to estimate the interference for subsequent SD-PIC processing. For example, the signal passed to user 1 will be the original received signal subtracted by the regenerated signal output from the channel summer 44 in the rake receiver for user 2.

Figure 10:
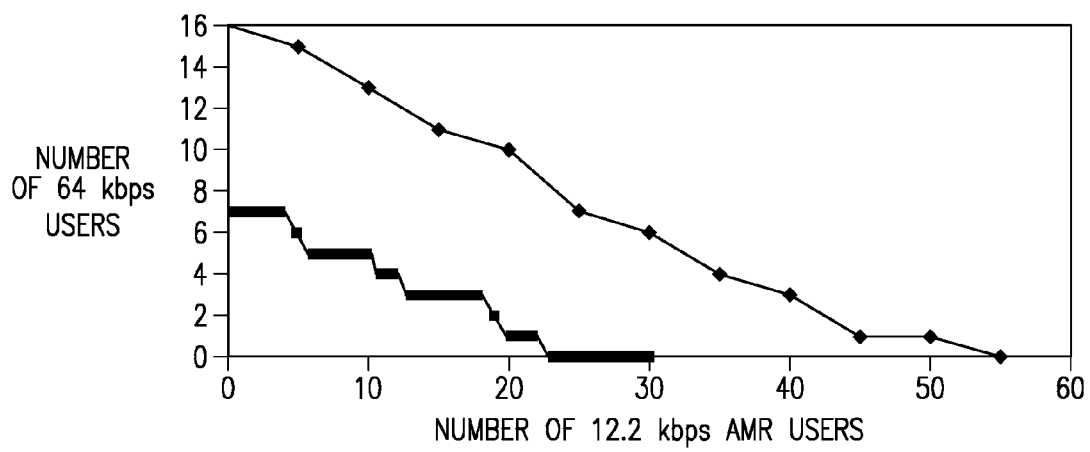
FIG. 10 illustrates a graph comparing the performance of a conventional DS/CDMA receiver and the receiver system of FIG. 7 assuming the W-CDMA reverse link.

FIG. 10 illustrates a graph comparing the performance of a conventional DS/CDMA receiver and the receiver system of FIG. 7 assuming the W-CDMA reverse link. The graph is assumes additive White Gaussian noise (AWGN) and that each user sends a single DPDCH and that this DPDCH is generated from a user sending Adaptive Multi-Rate (AMR) speech or 64 kbps packet data. AMR has a spreading factor of 64 whereas 64 kbps packet data has a spreading factor of 16. It also can be assumed, for example, that each user transmits a 3.4 kbps dedicated control channel DCCH along with the DPDCH and DPCCH. It is estimated that each service requires a frame error rate (FER) of 0.01 and that AMR users are power controlled to an $E_b/N_0$ of 4 dB and each 64 kbps packet data user is power controlled to an $E_b/N_0$ of 3 dB. The results show the maximum combination of AMR and 64 kbps packet data users for both the conventional receiver and a five-stage version of receiver 300. For example, the simulation shows that without any 64 kbps packet data users, a conventional receiver could support 31 AMR users whereas a five-stage version of receiver 300 could handle 55, a gain of 75%. In contrast, without any AMR users, seven 64 kbps packet data users could be supported by a conventional receiver whereas 16 could be handled by a five-stage version of receiver 300, a gain of 125%. Given 20 AMR users, the conventional receiver supports one 64 kbps users and receiver 300 serves ten 64 kbps users. In all cases, receiver 300 provides large capacity increases.

Figure 11:
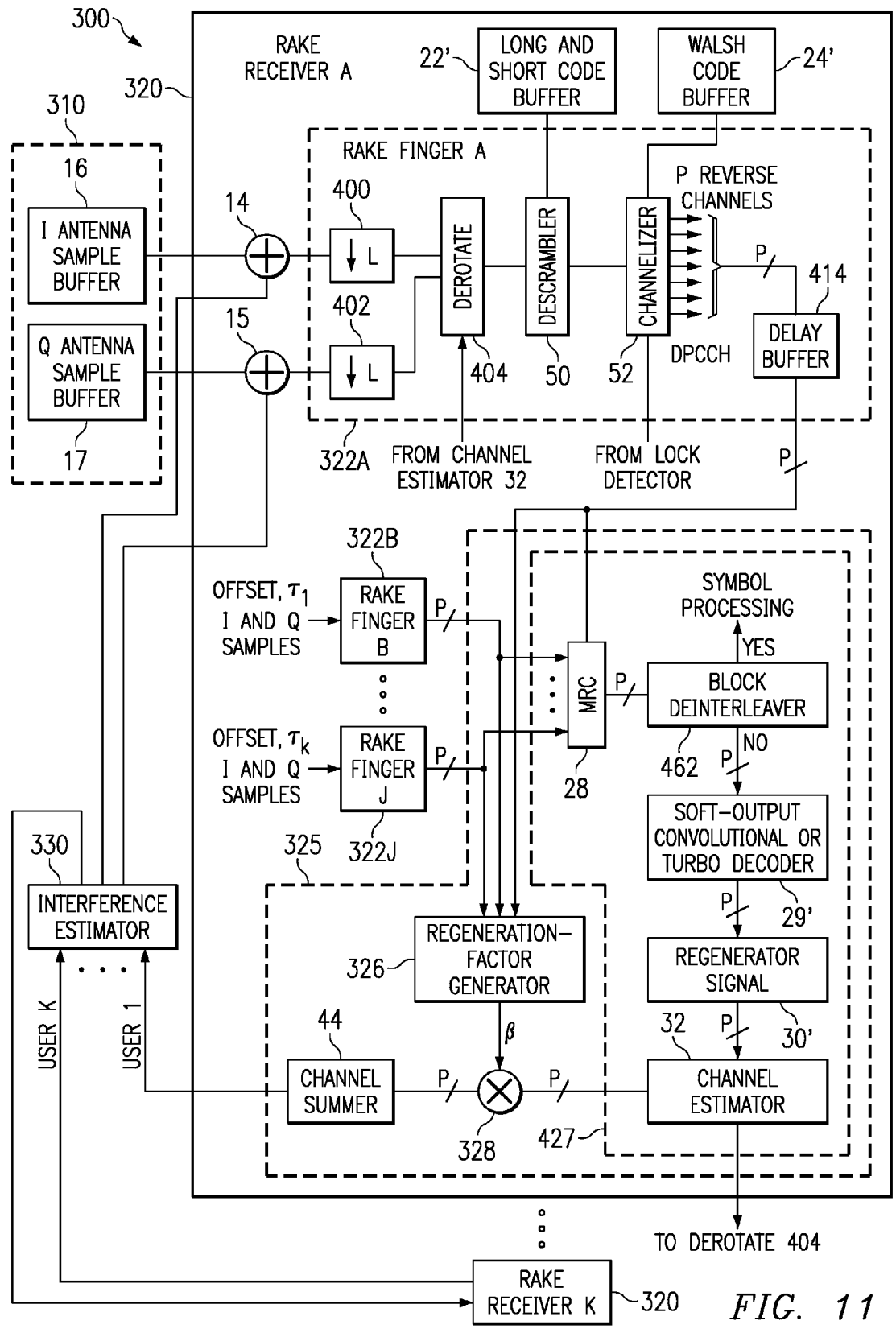
FIG. 11 illustrates a system block diagram of a receiver compatible with the IS-2000 standard, according to an embodiment of the present invention.

In an alternative embodiment, a regenerative IC receiver compatible with the IS-2000 standard can be implemented in a manner similar to that described for the receiver compatible with the W-CDMA standard where the soft-decision regeneration factor is generated by processing the soft-output of the maximal ratio combiner (MRC). FIG. 11 illustrates a system block diagram of a receiver compatible with the IS-2000 standard, according to an embodiment of the present invention. The system block diagram shown in FIG. 11 essentially corresponds to the system block diagram shown in FIG. 7, with the exception of certain components. More specifically, the receiver compatible with the IS-2000 standard includes long and short code buffer 22' and Walsh code buffer 24'. In addition, the receiver compatible with the IS-2000 standard includes a block deinterleaver 462', soft-output decoder 29' and signal regenerator 30' within the received-signal regenerator 427'. Soft-output decoder 29' can be, for example, a convolutional decoder or turbo decoder. The soft-decision regeneration factor is formed using the soft-output from the soft-output decoder 29'. The decoder can be selected, for example, to match the encoder (not shown in FIG. 11.) used on a particular channel. The decoder soft-output from. soft-output 29' can be, for example, in the form of the log-likelihood ratio (LLR) for a given symbol.

Known turbo decoders can output the soft-output information and known techniques have been proposed to generate the LLR from a convolutional decoder, such as Hagenauer et al., "A Viterbi Algorithm with Soft-Decision Outputs and its Applications," IEEE, 1989, pp. 1680-86. In one embodiment, the processing of the LLR to form the soft-decision regeneration factor can be performed, for example, by a hyperbolic tangent function. In alternative embodiments, other functions be employed, for example, any nondecreasing and continuous function limited to the range −1 to 1, such as a limited linear function, a shifted and scaled Gaussian integral function, an even periodic Mathieu function, an incomplete elliptical integral of the second kind, or a regular Coulomb wave function.

In yet other embodiments, the above-described regenerative IC interference cancellation techniques can also be employed in systems other than those using CDMA. For example, the above-described interference cancellation techniques can be used in a cellular time division multiple access (TDMA) system where each user is assigned a time-slot to communicate. Typically, users in such a system would not experience interference from other users simultaneously accessing the system because user transmissions are synchronized within a cell. In practice, however, interference can be caused by users sharing an overlapping frequency range but transmitting into the cell from other cells. In addition, the guard-time between time-slots may not be sufficient to prevent users in adjacent time-slots from interfering with one another. Moreover, interference can occur because of timing misalignments between users and propagation impairments such as multipath fading that cause time-spreading of user transmissions.

In embodiments of the present invention that demodulate users in a particular cell for a cellular TDMA system, the receiver system (e.g., a basestation) in the cell can estimate can the temporal characteristics of each user in the cell to determine the amount of interference caused by time-spreading and timing misalignments. This interference can then be subtracted from the received signal and weighted by the soft-decision regeneration factor to form the input to subsequent iteration(s) of interference cancellation. In addition, users in other cells causing interference to users in-cell would be demodulated and also subtracted from the received signal. Like the approach proposed for embodiments relating to the IS-95 and W-CDMA standards, the soft-decision regeneration factor could be derived, for example, using the LLR of demodulated but not decoded symbols. Alternatively, the soft-decision regeneration factor could be derived, for example, using the LLR of demodulated and decoded symbols, as per the approach described for embodiments related to the IS-2000 standard.

Although the present invention has been discussed above in reference to examples of embodiments and processes, other embodiments and/or processes are possible. For example, although certain embodiments described above referenced particular standards, such as the IS-95, W-CDMA and IS-2000, other embodiments of the present invention can be compatible with future standards and/or with other standards not named or discussed herein (e.g., TD-CDMA, HDR, etc.).

Note that the type of interference that is cancelled need not be the same as the type of signals used by the communication system. For example, a CDMA system can cancel interference from other CDMA users, but can also cancel interference from non-CDMA transmissions (e.g., TDMA users operating in overlapping frequency ranges and time ranges). For another example, a CDMA system operating over one frequency range can cancel interference from another CDMA system operating over a different frequency range.

What is claimed is:

1. A method for a communication system having at least a first user and a second user, comprising:
   determining in an apparatus a regeneration factor associated with the first user based on a received signal; and
   determining in said apparatus a regeneration factor associated with the second user based on the received signal, the regeneration factor associated with the first user being different from the regeneration factor associated with the second user, a frequency range associated with the first user having at least a portion overlapping with at least a portion of a frequency range associated with the second user, a time range associated with the first user having at least a portion overlapping with at least a portion of a time range associated with the second user.

2. The method of claim 1, further comprising:
   modifying a regenerated signal associated with the first user based on the determined regeneration factor associated with the first user to produce a modified regenerated signal associated with the first user; and
   modifying a regenerated signal associated with the second user based on the determined regeneration factor associated with the second user to produce a modified regenerated signal associated with the second user.

3. The method of claim 2, further comprising:
   regenerating an estimate of a contribution associated with the first user to the received signal based on a detected signal associated with the first user to produce the regenerated signal associated with the first user;
   regenerating an estimate of a contribution associated with the second user to the received signal based on a detected signal associated with the second user to produce the regenerated signal associated with the second user;
   estimating an interference signal associated with the first user based on the modified regenerated signal associated with the first user;
   estimating an interference signal associated with the second user based on the modified regenerated signal associated with the second user;
   subtracting the interference signal associated with the second user from the received signal to produce a next-stage signal associated with the first user; and subtracting the interference signal associated with the first user from the received signal to produce a next-stage signal associated with the second user.

4. The method of claim 1, further comprising:
   receiving a first portion of the received signal at a first time period and a second portion of the received signal at a second time period,
   the regeneration factor associated with the first user having a first value determined based on the first portion of the received signal and having a second value determined based on the second portion of the received signal,
   the regeneration factor associated with the second user having a first value determined based on the first portion of the received signal and having a second value determined based on the second portion of the received signal.

5. The method of claim 1, wherein the determining the regeneration factor associated with the first user and determining the regeneration factor associated with the second user are iteratively repeated.

6. The method of claim 1, wherein the determining the regeneration factor associated with the first user and determining the regeneration factor associated with the second user are performed for the first user and the second user substantially concurrently in parallel.

7. The method of claim 1, wherein the determining the regeneration factor associated with the first user is calculating the regeneration factor associated with the first user based on a function of a soft decision associated with the received signal.

8. The method of claim 1, wherein the determining the regeneration factor associated with the first user is calculating the regeneration factor associated with the first user based on a function of a likelihood ratio associated with the received signal.

9. The method of claim 1, wherein the determining the regeneration factor associated with the first user is calculating the regeneration factor associated with the first user based on a hyperbolic tangent function of a likelihood ratio associated with the received signal.

10. The method of claim 1, wherein the determining the regeneration factor associated with the first user is calculating the regeneration factor associated with the first user based on a hyperbolic tangent function of a soft decision associated with the received signal.

11. The method of claim 1, wherein:
    the first user is associated with a first communication cell, and the second user is associated with a soft handoff from a second communication cell to the first communication cell.

12. A method for a communication system, comprising:
    receiving in an apparatus a signal associated with a plurality of users to produce a received signal;
    determining in said apparatus a plurality of regeneration factors associated with the plurality of users based on the received signal, a frequency range associated with a first user from the plurality of users having at least a portion overlapping with at least a portion of a frequency range associated with a second user from the plurality of users, a time range associated with the first user from the plurality of users, having at least a portion overlapping with at least a portion of a time range associated with the second user from the plurality of users; and
    modifying a regenerated signal associated with each user from the plurality of users based on a determined regeneration factor associated with a user to produce a modified regenerated signal for each user.

13. The method of claim 12, wherein each regeneration factor from the plurality of regeneration factors being uniquely associated with a user from the plurality of users.

14. The method of claim 12, wherein each regeneration factor from the plurality of regeneration factors is determined separately.

15. The method of claim 12, further comprising:
regenerating an estimate of a contribution to the received signal associated with each user from the plurality of users based on a detected signal to produce the regenerated signal associated with each user from the plurality of users; and
estimating an interference signal associated with each user from the plurality of users based on the modified regenerated signal associated with each user.

16. The method of claim 12, wherein the determining and the modifying are iteratively repeated.

17. The method of claim 12, wherein the determining and the modifying are performed substantially concurrently in parallel for each user from the plurality of users.

18. The method of claim 12, wherein the determining the plurality of regeneration factors is calculating the plurality of regeneration factors based on a function of a soft decision associated with the received signal.

19. The method of claim 12, wherein the determining the plurality of regeneration factors is calculating the plurality of regeneration factors based on a hyperbolic function of a likelihood ratio associated with the received signal.

20. The method of claim 12, wherein the determining the plurality of regeneration factors is calculating the plurality of regeneration factors based on a hyperbolic tangent function of a soft decision associated with the received signal.

21. The method of claim 12, wherein the determining the plurality of regeneration factors is calculating the plurality of regeneration factors based on a hyperbolic tangent function of a likelihood ratio associated with the received signal.

22. The method of claim 12, wherein the plurality of users is associated with one from the group of a first communication cell and a soft handoff from a second communication cell to the first communication cell.

23. A method for a communication system, comprising:
determining in an apparatus a plurality of soft-decision regeneration factors associated with a plurality of users, each soft-decision regeneration factor from the plurality of soft-decision regeneration factors being uniquely associated with each user from the plurality of users; and
canceling interference, for a user from the plurality of users, from a received signal based on the plurality of soft-decision regeneration factors excluding the soft-decision regeneration factor associated with the user.

24. An apparatus, comprising:
a first regeneration-factor processor, the first regeneration-factor processor determining a regeneration factor associated with a first user based on a received signal; and
a second regeneration-factor processor coupled to the first regeneration-factor processor, the second regeneration-factor processor determining a regeneration factor associated with a second user based on the received signal, a frequency range associated with the first user having at least a portion overlapping with at least a portion of a frequency range associated with the second user, a time range associated with the first user having at least a portion overlapping with at least a portion of a time range associated with the second user.

25. The apparatus of claim 24, further comprising:
a first modified-signal generator coupled to the first regeneration-factor processor, the first modified-signal generator receiving the regeneration-factor associated with the first user from the first regeneration-factor processor and receiving a regenerated signal associated with the first user, the first modified-signal generator modifying the regenerated signal associated with the first user based on the regeneration-factor associated with the first user; and
a second modified-signal generator coupled to the second regeneration-factor processor, the second modified-signal generator receiving the regeneration-factor associated with the second user from the second regeneration-factor processor and
receiving a regenerated signal associated with the second user, the second modified-signal generator modifying the regenerated signal associated with the second user based on the regeneration-factor associated with the second user.

26. The apparatus of claim 25, further comprising:
an interference estimator coupled to the first modified-signal generator and the second modified-signal generator, the interference estimator estimating an interference signal associated with the second user, the interference estimator subtracting the interference signal associated with the second user from the received signal to produce a next-stage signal associated with the first user.

27. The apparatus of claim 26, wherein the interference estimator estimates an interference signal associated with the first user, the interference estimator subtracting the interference signal associated with the first user from the received signal to produce a next-stage signal associated with the second user.

28. The apparatus of claim 25, further comprising:
a first user-contribution received-signal regenerator coupled to the first modified-signal generator, the first user-contribution received-signal regenerator producing the regenerated signal associated with the first user based on the received signal, the first user-contribution received-signal regenerator including a channel estimator associated with a low-pass filter determined as a function of an expected Doppler frequency associated with the first user; and
a second user-contribution received-signal regenerator coupled to the second modified-signal generator, the second user-contribution received-signal regenerator producing the regenerated signal associated with the second. user based on the received signal, the second user-contribution received-signal regenerator including a channel estimator associated with a low-pass filter determined as a function of an expected Doppler frequency associated with the second user.

29. The apparatus of claim 25, further comprising:
a first user-contribution received-signal regenerator coupled to the first modified-signal generator, the first user-contribution received-signal regenerator producing the regenerated signal associated with the first user based on the received signal, the first user-contribution received-signal regenerator including a channel estimator; and
a second user-contribution received-signal regenerator coupled to the second modified-signal generator, the second. user-contribution received-signal regenerator producing the regenerated signal associated with the second user based on the received signal, the second user-contribution received-signal regenerator including a channel estimator.

30. The apparatus of claim 24, wherein the first regeneration-factor processor determines the regeneration factor associated with the first user based on the received signal and the second regeneration-factor processor determines the regeneration factor associated with the second user based on the received signal repeatedly in an iterative manner.

31. The apparatus of claim 24, wherein the first regeneration-factor processor determines the regeneration factor associated with the first user based on the received signal and the second regeneration-factor processor determines the regeneration factor associated with the second user based on the received signal substantially concurrently in parallel.

32. The apparatus of claim 24, wherein the first regeneration-factor processor determines the regeneration factor associated with the first user by calculating the regeneration factor associated the first user based on a function of a soft decision associated with the received signal.

33. The apparatus of claim 24, wherein the first regeneration-factor processor
determines the regeneration factor associated with the first user by calculating the
regeneration factor associated with the first user based on a function of a likelihood ratio associated with the received signal.

34. The apparatus of claim 24, wherein the first regeneration-factor processor determines the regeneration factor associated with the first user is calculating the regeneration factor associated with the first user based on a hyperbolic tangent function of a likelihood ratio associated with the received signal.

35. The apparatus of claim 24, wherein the first regeneration-factor processor determines the regeneration factor associated with the first user is calculating the regeneration factor associated with the first user based on a hyperbolic tangent function of a soft decision associated with the received signal.

36. The apparatus of claim 24, wherein:
the first user is associated with a first communication cell, and
the second user is associated with a soft handoff from, a second communication cell to the first communication cell.

37. An apparatus, comprising:
a plurality of regeneration-factor generators determining a plurality of regeneration factors associated with a plurality of users based on a received signal to produce a plurality of regeneration-factor signals, a frequency range associated with a first user from the plurality of users having at least a portion overlapping with at least a portion of a frequency range associated with a second user from the plurality of users, a time range associated with the first user from the plurality of users having at least a portion overlapping with at least a portion of a time range associated with the second user from the plurality of users; and
a plurality of modified-signal generators coupled to the plurality of regeneration-factor generators, the plurality of modified-signal generators receiving the plurality of regeneration-factor signals from the plurality regeneration-factor generators and receiving a plurality of regenerated signals, the plurality of modified-signal generators modifying the plurality of regenerated signals based on the plurality of regeneration-factor signals.

38. The apparatus of claim 37, wherein:
each regeneration-factor generator from the plurality of regeneration-factor generators is uniquely associated with a user from the plurality of users.

39. The apparatus of claim 37, further comprising:
an interference estimator coupled to the plurality of modified-signal generators, the interference estimator estimating an interference signal associated with each user from the plurality of users, the interference estimator subtracting the interference signal associated with each user from the received signal to produce a next-stage signal associated with each user.

40. The apparatus of claim 37, wherein the plurality of regeneration-factor generator's determines the plurality of regeneration factors are iteratively repeated.

41. The apparatus of claim 37, wherein the plurality of regeneration-factor generators determines the plurality of regeneration factors substantially concurrently in parallel.

42. The apparatus of claim 37, wherein the plurality of regeneration-factor generators calculates the regeneration factor associated with each user based on a function of a soft decision associated with the received signal.

43. The apparatus of claim 37, wherein the plurality of regeneration-factor generators calculates the regeneration factor associated with each user based on a function of a likelihood ratio associated with the received signal.

44. The apparatus of claim 37, wherein the plurality of regeneration-factor generators calculates the regeneration factor associated with each user based on a hyperbolic tangent function of a likelihood ratio associated with the received signal.

45. The apparatus of claim 37, wherein the plurality of regeneration-factor generators calculates the regeneration factor associated with each user based on a hyperbolic tangent function of a soft decision associated with the received signal.

46. The apparatus of claim 37, wherein:
the first user of the plurality of users is associated with a first communication cell, and
the second user of the plurality of users is associated with a soft handoff from a second communication cell to the first communication cell.

47. An apparatus, comprising:
a regeneration-factor processor, the regeneration-factor processor determining a regeneration factor associated with each user from a plurality of users based on a received signal, a frequency range associated with a first user from the plurality of users having at least a portion overlapping with at least a portion of a frequency range associated with a second user from the plurality of users, a time range associated with the first user from the plurality of users having at least a portion overlapping with at least a portion of a time range associated with the second user from the plurality of users; and
a modified-signal generator coupled to the regeneration-factor processor, the regeneration-factor processor and the modified-signal generator operating in series for each user from the plurality of users.

48. An apparatus, comprising:
means for determining a regeneration factor associated with a first user based on a received signal; and
means for determining a regeneration factor associated with a second user based on the received signal, the regeneration factor associated with the first user being different from the regeneration factor associated with the second user, a frequency range associated with the first user having at least a portion overlapping with at least a portion of a frequency range associated with the second user, a time range associated with the first user having at least a portion overlapping with at least a portion of a time range associated with the second user.

49. A method for performing estimation within a communication system, comprising:
determining in an apparatus a cutoff frequency based on an expected Doppler frequency associated with a user; and
estimating a phase and an amplitude of each multipath component associated with a received signal based on the determined cutoff frequency.

50. A method for performing estimation within a communication system, comprising:

determining in an apparatus a cutoff frequency based on an expected Doppler frequency associated with a user; and low-pass filtering a plurality of rake finger signals based on the determined cutoff frequency to produce an estimated phase and an estimated amplitude of each multipath component associated with a received signal.

* * * * *